United States Patent [19]
Smith

[11] 3,743,824
[45] July 3, 1973

[54] CARRY RIPPLE NETWORK FOR CONDITIONAL SUM ADDER

[75] Inventor: Allan Marshall Smith, Moorestown, N.J.

[73] Assignee: RCA Corporation, Princeton, N.J.

[22] Filed: June 16, 1971

[21] Appl. No.: 153,665

[52] U.S. Cl. .................................................. 235/175
[51] Int. Cl. ................................................ G06f 7/50
[58] Field of Search ..................... 235/175; 307/203, 307/207

[56] References Cited

UNITED STATES PATENTS

| | | | |
|---|---|---|---|
| 3,553,446 | 1/1971 | Kroy | 235/175 |
| 3,316,393 | 4/1967 | Ruthazer | 235/175 |
| 3,100,835 | 8/1963 | Bedrij | 235/175 |
| 2,954,168 | 9/1960 | Maddox | 235/175 |

*Primary Examiner*—Malcolm A. Morrison
*Assistant Examiner*—David H. Malzahn
*Attorney*—H. Christoffersen

[57] ABSTRACT

A high-speed carry ripple or propagation circuit including a network of gates and load devices for use with a conditional sum adder. The transmission gates and load devices comprise semiconductor elements. The transmission gates are combined in series and parallel paths to effect desired signal control. The carry ripple circuit generates the required propagated carry signal for the conditional sum adder more rapidly than many prior art networks.

6 Claims, 6 Drawing Figures

Patented July 3, 1973 3,743,824

4 Sheets-Sheet 1

INVENTOR.
ALLAN MARSHALL SMITH
BY
G. Donald Weber, Jr.
ATTORNEY

INVENTOR.
ALLAN MARSHALL SMITH
BY J. Donald Weber, Jr.
ATTORNEY

INVENTOR.
ALLAN MARSHALL SMITH
BY
J. Donald Wedeking
ATTORNEY

INVENTOR.
ALLAN MARSHALL SMITH
BY
J. Donald Weber, Jr.
ATTORNEY

CARRY RIPPLE NETWORK FOR CONDITIONAL SUM ADDER

CROSS REFERENCES AND BACKGROUND OF THE INVENTION

Conditional sum adders and carry ripple networks are known in the art. One description thereof is found in U.S. Pat. No. 3,249,746 entitled "Data Processing Apparatus" by W.A. Helbig et al. which is assigned to the common assignee. Another description of parallel adders which employ parallel gates is found in Chapter 4 of "Arithmetic Operations in Digital Computers," by R.J. Richards, published in 1955 by D. Van Nostrand, Inc. According to these references, the carry ripple gates function to transmit or not transmit a carry signal to the next higher adder stage depending upon the two augend and addend digits already present at the transmitting stage. Certain of the prior art carry ripple gates require an input carry signal to propagate through two or more gating circuits before the output carry signal is produced. Also, certain of the prior art ripple gates described in the references cited use three or more logic circuits to generate the carry signal. It is apparent that the adder speed can be increased by decreasing the time required for the carry ripple circuit to transmit the carry signal.

Moreover, by implementing the carry ripple network using integrated circuit semiconductors, certain improvements in operation time may be effected as well as the inherent advantages of the integrated circuit configuration, such as size requirements and the like.

SUMMARY OF THE INVENTION

This invention relates to a high-speed carry ripple or propagation network using gates connected in series and parallel combinations as well as precharge load devices. These gates and load devices may typically include suitable semiconductor devices. The semiconductor devices are connected together to provide a network wherein signals are generated to represent the condition of a carry signal at a particular stage in the adder network.

DETAILED DESCRIPTION

Figure 1:
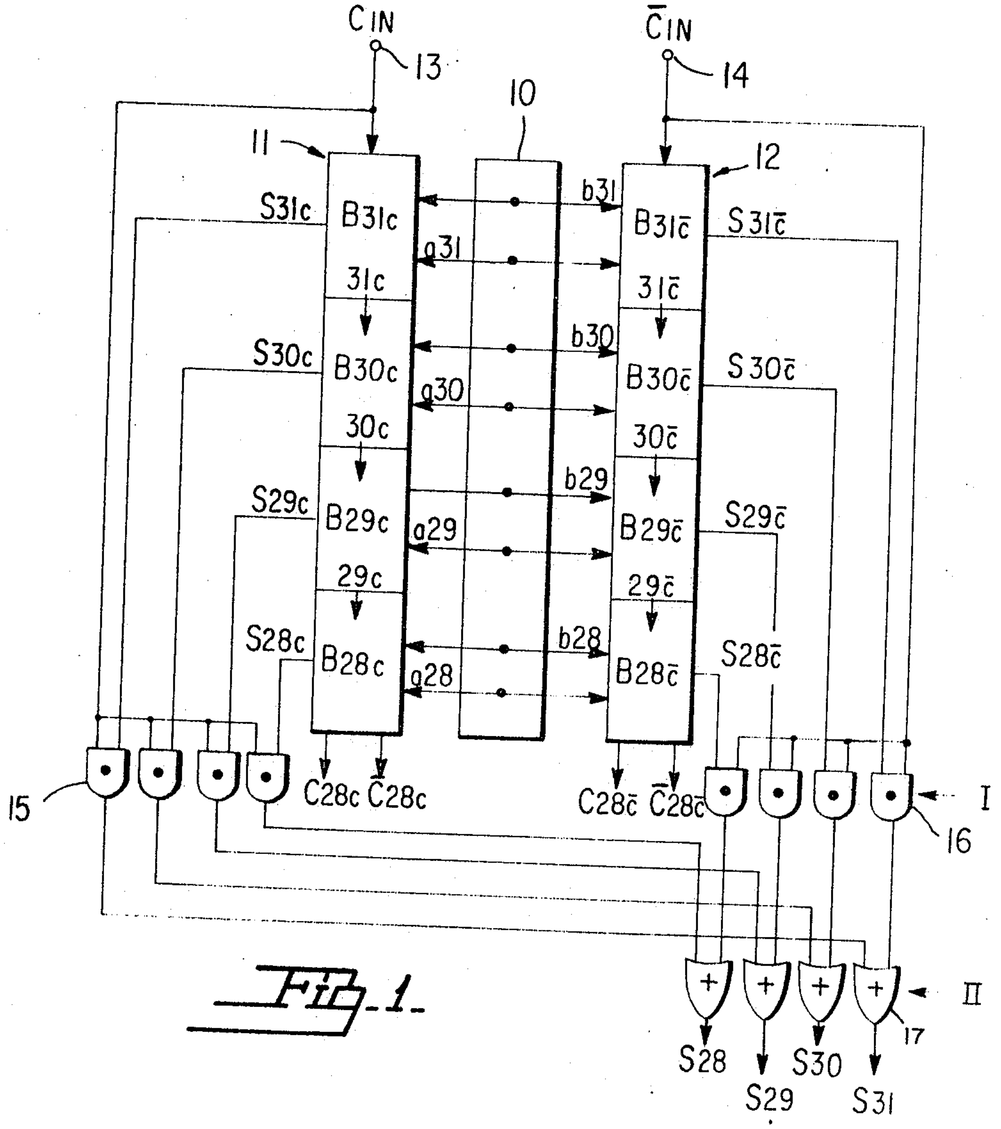
FIG. 1 is a block diagram representation of one rank of four carry ripple stages of a conditional sum adder.

In the several Figures, similar components bear similar reference numerals.

Referring now to FIG. 1, there is shown a block diagram of a typical adder or summing network. In this configuration, separate carry ripple adders 11, 12 are shown for the carry (C) and carry-not ($\bar{C}$) signals. This arrangement is not essential in many circuit configurations since the carry signal will be either present (e.g., a binary 1) or absent (e.g., a binary 0) prior to the initiation of an ADD of two operands, herein designated an and bn. However, inasmuch as the circuit shown in FIG. 1 is designed for modular construction as described hereinafter, the CIN and $\bar{C}$IN signals are supplied separately. The CIN signal is supplied to terminal 13 of adder 11 and to one input terminal of each of AND gates 15. The $\bar{C}$IN signal is supplied to terminal 14 of adder 12 and to one input terminal of each of AND gates 16. Gates 15 and 16 comprise logic level I. The other input terminal of each of gates 15 is connected to the output terminal of a separate stage of adder 11 to receive the sum output thereof. The other input terminal of each gate 16 is connected to the output of a separate stage of adder 12 to receive the sum output thereof. The output terminals of corresponding gates 15 and 16 are connected to the inputs of OR gates 17 (logic level II). Input register 10 has a separate pair of output terminals connected to the input terminals of each stage in the carry ripple adders 11 and 12.

Figure 2:
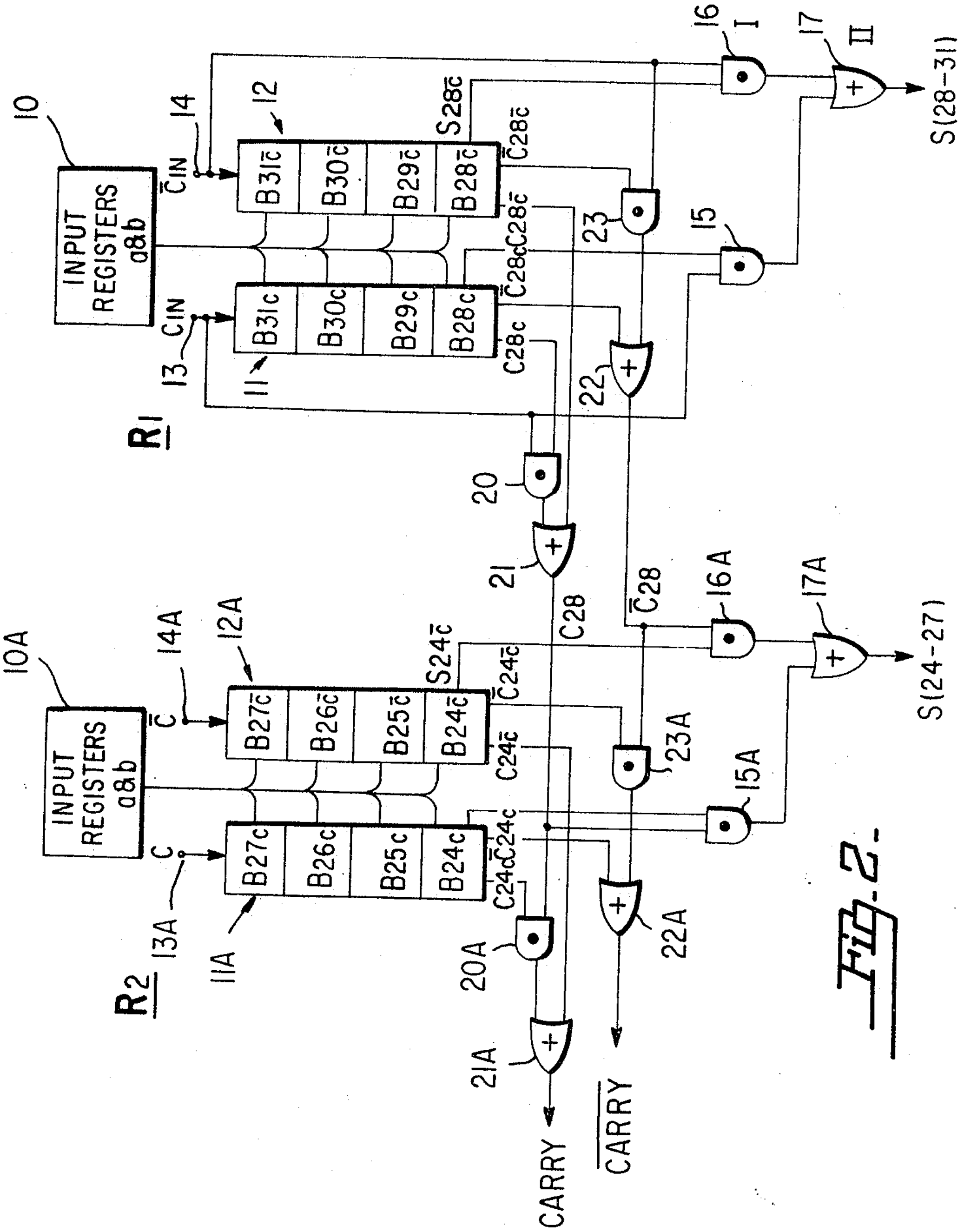
FIG. 2 is a block diagram representation of two such ranks of an adder network with a carry ripple network associated therewith.

Specifically, the circuit shown in FIG. 1 represents one portion of a conditional adder which operates on a 32-bit format. That is, each information word comprises 32 binary digits (bits). The bits are numbered 0 through 31, the latter being the least significant bit. The 32-bit format is illustrative only and is not meant to be limitative of the invention. The stages in the respective adders are labeled B31, B30, B29, B28 and the like. In addition, each stage designation includes a suffix *c* or $\bar{c}$ to indicate that the stage is part of the carry ripple adder which receives the C or $\bar{C}$ input signal. The addend and augend input signals supplied to each stage are designated by the small letter symbols a and b with a numeral suffix which is the same as the bit number of the associated stage in the adder. For example, stages B31*c* and B31$\bar{c}$ receive input signals *a*31 and *b*31. The same nomenclature arrangement applies in the other stages. The derived carry output signal (i.e., N*c* or N$\bar{c}$) from each stage is supplied to the following stage in each adder as suggested by the interstage arrows. The last stage in each adder rank produces a carry (C) and a carry-not ($\bar{C}$) signal which is identified by the bit number for the last stage in the adder. For example, the carry signals C28*c* and $\bar{C}$28*c* are produced by stage B28*c*. On the other hand, stage B28*c* produces the output carry signal C28$\bar{c}$ and $\bar{C}$28$\bar{c}$. These signals are supplied to subsequent stages in the adder, which subsequent stages may be in a different rank as shown in FIG. 2.

The circuit shown in FIG. 1 provides standard adder operation with a slight modification to permit the modular form of the adder. For example, both stages B31*c* and B31$\bar{c}$ operate upon input signals *a*31 and *b*31 to add the signals. In addition, these stages receive the carry signal CIN or $\bar{C}$IN, respectively. This signal is operated upon in conjunction with the appropriate *a* and *b* signals to produce sum and carry signals. For example, stage B31*c* produces the sum signal S31*c* which is applied to an input terminal of one of gates 15 and the carry signal 31*c* which is supplied directly to the succeeding stage B30*c*. Concurrently, stage B31$\bar{c}$ operates upon the input signals supplied thereto and produces the output sum signal S31*c* which is applied to an input of one of gates 16 and the carry signal 31$\bar{c}$ which is supplied to stage B30$\bar{c}$.

Stages B30*c* and B30$\bar{c}$ each receive the *a*30 and *b*30 input signals in addition to the 31*c* or 31$\bar{c}$ signal (as defined supra). Stages B30$c$ and B30$\bar{c}$ operate upon all of the applied signals in standard fashion. These stages produce the output sum signals S30$c$ and S30$\bar{c}$, respectively, which are applied to input terminals of appropriate ones of gates 15 and 16, respectively. In addition, each of these stages produces an output carry signal (30$c$ or 30$\bar{c}$) of the appropriate level which is supplied to the succeeding stage, viz. stage B29$c$ or B29$\bar{c}$. Stages B29$c$ and B29$\bar{c}$ operate on the carry signal and the pertinent input signals as did the prior stages. This type of operation continues whereby the respective sum signals are produced by the stages of both adders 11 and 12 and are supplied to input terminals of the appropraite one of gates 15 or gates 16. In addition, the carry signals which are a function of the signals supplied to each stage are generated and supplied to the next succeeding stage.

The sum signals are supplied either to gates 15 or gates 16 as described. Gates 15 are enabled by the application of a CIN signal at terminal 13. Conversely, gates 16 are enabled when a $\overline{\text{CIN}}$ signal is applied at terminal 14. Since the CIN or $\overline{\text{CIN}}$ signals are complements and only one or the other is applied at any time, (i.e., is a binary 1) gates 15 or gates 16 are enabled alternatively. The output terminals of corresponding gates 15 and gates 16 are connected to input terminals of OR gates 17. Gates 17 produce output sum signals S28, S29, S30 and S31. These output sum signals are applied to any suitable utilization device and represent the actual sum signals produced by the adder registers in response to the prescribed carry signal status.

The last stage in each adder produces output signals representative of the carry signal produced therein and the complement thereof, such as carry signals C28$c$ and $\overline{\text{C}}$28$c$ from stage B28$c$. The carry signals produced by the output stages of the adders are connected to the carry ripple network which is connected to additional adder ranks, as will be seen hereinafter.

Referring now to FIG. 2, there is shown a block diagram of a conditional adder utilizing two modular adders and a carry ripple network shown in block diagram form. Each of adder ranks R1 and R2 is similar to the adder network shown in FIG. 1. Each of these adder ranks includes a pair of carry ripple adders such as adders 11 and 12 or 11A and 12A. Input registers 10 or 10A supply signals a and b to each of the adder stages. The input carry signals CIN or $\overline{\text{CIN}}$ (in the case of adder R1) or C and $\overline{\text{C}}$ (in the case of adder R2) supply conditional carry signals to the adders. As suggested supra, in the case of adder R1 the CIN and $\overline{\text{CIN}}$ signals are generated by circuitry external to the adder circuit and are representative of a particular carry signal. Moreover, a single adder could be utilized in the first rank except for the desirability of the modular construction.

In the case of adder R2, the C and $\overline{\text{C}}$ signals are prescribed, defined signals of a fixed magnitude from suitable external circuitry, not shown. For example, signal C is defined as a binary 1 while signal $\overline{\text{C}}$ is defined as a binary 0 signal. (The definition of the signals can be reversed.) Adders 11A and 12A operate upon the input signals supplied by input register 10A. In addition, the adders operate on these signals in accordance with the application of the C or $\overline{\text{C}}$ signal, respectively. This operation permits a signal to be generated by the last stage in each adder rank, for example, stages B24$c$ and B24$\bar{c}$, which signals are representative of the adder operation in response to a C or $\overline{\text{C}}$ signal, respectively. The effect of this type of operation is that adder R2 and adder R1 can be operating concurrently so that eight adder stages can be operative in the time duration required for only four stages. Thus, it is not necessary to actually determine the output carry signal produced by the last stage in any particular adder for application to the input stage of the next adder prior to operation thereof. Rather, all succeeding adders operate concurrently with the first adder with hypothetical or conditional carry signals C and $\overline{\text{C}}$ supplied. However, the actual carry signal from the preceding rank is transmitted through the carry ripple network to select the output signals from the appropriate C or $\overline{\text{C}}$ adder in the succeeding rank. Thus, if the carry output signal $\overline{\text{C}}$28 supplied by adder R1 is, in fact, a binary 1 (under the definition given supra), the sum output signals from adder 12A will be transmitted to the remainder of the circuit via gates 16A and 17A while the signals produced by adder 11A will be ignored because complementary carry signal C28 is a binary 0. Conversely, if the carry output signal C28 produced by adder R1 is a binary 1, the output signals produced by adder 11A will be utilized by gate 17A (via gates 15A) and the signals from adder 12A will be ignored because complementary carry signal $\overline{\text{C}}$28 is a binary 0. Clearly, this type of operation permits several relatively small adder circuits to operate in parallel rather than to require one long serial operation. Consequently, the final output signal is produced in a time period defined by the operating time of a single adder rank plus the propagation time required by the carry ripple network. Of course, if the bit length of the information word being operated upon is less than a determinable critical length, there may not be a significant increase in circuit operation speed and serial addition may be satisfactory. However, it can be shown that, for an information word having the length of 32 bits, for example, an increase in speed of approximately 3 to 1 can be achieved by utilizing a plurality of 4-bit adders connected together with a carry ripple network.

As suggested supra, the adder ranks are connected together by the carry ripple network to determine which of the individual adders in the succeeding rank will be permitted to supply signals to the external circuit. For example, AND gate 20 receives input signals from the CIN terminal and from the C28$c$ output terminal of stage B28$c$ in adder 11. The output of AND gate 20 is connected to one input of OR gate 21. The other input of OR gate 21 is connected to receive the C28$\bar{c}$ carry output signal from stage B28$\bar{c}$ of register 12. Thus, the combination of gates 20 and 21 solves the logic equation $CIN \cdot C28c + C28\bar{c} = C28$. This signal ($C28$) is supplied to one input of AND gate 20A and is analogous to the $CIN$ signal at gate 20. The other input of gate 20A is connected to receive the C24$c$ carry output signal of stage B24$c$ of adder 11A in rank R2. The output of gate 20A is supplied to an input of OR gate 21A. The other input of OR gate 21A is connected to receive the C24$\bar{c}$ output signal from stage B24$\bar{c}$ of adder 12A of rank R2. Thus, gate 21A produces the CARRY signal for the next succeeding adder rank. A similar gate circuit configuration is provided for the succeeding adder ranks (not shown) which are required to produce an adder network of sufficient length to handle the information word length.

In a similar manner, AND gate 23 receives the $\overline{\text{CIN}}$ signal as well as the $\overline{\text{C}}$28$\bar{c}$ signal. The output of gate 23 is connected to an input of OR gate 22. Another input of gate 22 is connected to receive the $\overline{C}$28*c* output signal from stage B28*c* of adder 11. This gate combination solves the logic equation $\overline{CIN} \cdot \overline{C}28c + \overline{C}28c = \overline{C}28$. The $\overline{C}$28 signal is supplied as one input to AND gate 23A and is analogous to the $\overline{CIN}$ signal at gate 23. Another input of gate 23A is connected to receive the $\overline{C}24\bar{c}$ signal from stage B24$\bar{c}$ of adder 12A of adder rank R2. The output of gate 23A is connected to one input of OR gate 22A. The other input of OR gate 22A is connected to receive the $\overline{C}$24*c* signal from stage B24*c* of adder 11A of adder rank R2. This gate provides the $\overline{\text{CARRY}}$ output signals for generation through the carry ripple network.

In addition, for each adder rank there is an output network as suggested in FIG. 1. In adder rank R1 of FIG. 2, the output network includes AND gates 15 and 16 at logic level I and OR gates 17 at logic level II. Only one gate 15 and one gate 16 are illustrated for clarity. Whereas there are four such gates in each set, as shown in FIG. 1. There are also four OR gates 17, again as shown in FIG. 1, although only one such gate is shown in FIG. 2 for simplicity. It is seen that gates 15 or 16 are selectively enabled by the application of a *CIN* or $\overline{CIN}$ signal to transmit the output sum signals S28*c*–S31*c* or S28$\bar{c}$–S31$\bar{c}$, respectively. OR gates 17 transmit the signals from gates 15 or 16 to the output device as represented by output signals S28–S31. Similarly, the output network of adder rank R2 comprises AND gates 15A and 16A at logic level I and OR gates 17A at logic level II.

In the output network associated with adder R2, gates 15A are enabled by the application of the C28 signal (i.e., a true carry signal) from adder R1. When gates 15A are enabled, the sum signals S24*c*–S27*c* from adder 11A are transmitted therethrough to OR gates 17A. Alternatively, AND gates 16A are enabled by the application of the $\overline{C}$28 signal. When gates 16A are enabled, the sum signals S24$\bar{c}$ through S27$\bar{c}$ are transmitted to OR gates 17A. OR gates 17A transmit the signals from gates 15A or 16A to the output device. Thus, the output signals from the adder which received the C input signal are selected in response to the C carry signal from the preceding adder while the output signals from the adder which received the $\overline{C}$ input signal are selected in response to a $\overline{C}$ signal from the preceding adder in the network.

The preceding description relates to an adding circuit which includes a carry ripple network. The concept of adding circuits is known in the art but is described herein for the purpose of illustrating a utilization of a carry ripple circuit.

The carry ripple circuit is utilized to provide a CARRY signal which, in effect, selects the appropriate signals from conditional adders and supplies these appropriate signals to a utilization device. The particular logic circuit configuration may be varied so long as the overriding concept is maintained. For example, gates 16 may be enabled by a *CIN* (or related) signal rather than the $\overline{CIN}$ (and related) signals. However, it is required that the CARRY signals generated by the carry ripple network selectively enable either gates 15 or gates 16 mutually exclusively. Consequently, the outputs of gates 20 and 21 may be inverted (relative to the description related to FIGS. 1 and 2) so long as the signals *C*28 and $\overline{C}$28 (and counterpart signals) are complementary.

Figure 3:
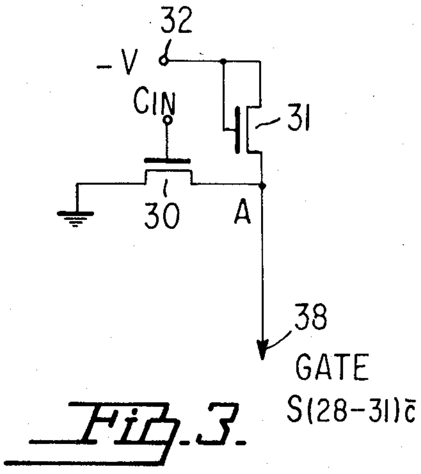
FIGS. 3 and 3*a* are schematic diagrams of gates used in one embodiment of the carry ripple network embodying this invention.
Figure 3A:
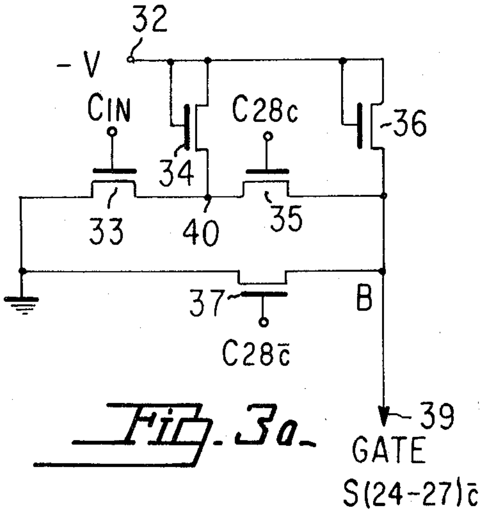

In one embodiment of the carry ripple circuit which is described, a plurality of logic gating networks are required. A separate logic network is required for each gating line, i.e. for supplying the enabling signal to each output AND gate at logic level I. Gating networks of the type included in the invention are shown in FIGS. 3 and 3*a* and are fabricated of PMOS integrated circuitry. In FIG. 3, transistor 30, of the metal oxide-semiconductor (MOS) type, has the conduction path thereof connected between ground potential and node A which is, essentially, the output terminal. The control electrode of transistor 30 is connected to the *CIN* input, for example input terminal 13 (FIG. 1 or 2). Load device (or transistor) 31, has the conduction path thereof connected between a suitable potential source at terminal 32 and the aforesaid node A. The potential supplied at terminal 32 is, in this embodiment, a negative voltage −V. Terminal 32 is also connected to the control electrode of load transistor 31. Node A is connected via terminal 38 to the input terminal of the output logic circuit. Thus, transistor 30 and load transistor 31 form an inverter circuit which produces an output signal which is the inverse of the input (control) signal at the control electrode of transistor 30. This inherent inversion may require specific arrangements of the general logic circuits shown in FIGS. 1 and 2.

In operation, a PMOS device is rendered conductive when the voltage applied to the control electrode thereof is negative with respect to the voltage applied to the source electrode thereof. Therefore, load transistor 31 is normally conductive inasmuch as the voltage −V is supplied to the control electrode thereof whereby node A is precharged to the −V voltage level. However, transistor 30 is rendered conductive and selectively clamps node A to ground potential when the input signal *CIN* is relatively negative (i.e. a binary 1 signal) with respect to ground potential. Conversely, if *CIN* is a binary 0 (e.g. ground potential), transistor 30 is nonconductive and node A remains at the −V potential. The signal at node A is, of course, transmitted to terminal 38 and, thence, to the output logic network for operation thereupon as will be described hereinafter.

In the circuit shown in FIG. 3, the gating network essentially inverts the control signal, i.e. *CIN*, and produces an output signal representative thereof. This inverted signal can be supplied directly to gates 16 in FIG. 1 or reinverted and supplied to gates 15 of FIG. 1. This particular interconnection is a function of the overall circuit configuration and is not critical to the invention, per se. Moreover, in some cases, this particular logic gate network will not be required inasmuch as the *CIN* signal can be applied directly to the terminal 38. In that case, the *CIN* signal will be applied directly to the gates having the suffix *c* rather than the suffix $\bar{c}$. That is, the inherent signal inversion caused by the operation of transistor 30 would be eliminated.

Referring to FIG. 3*a*, there is shown another gating network including transistors 33 and 35 having the conduction paths thereof connected in series and between ground potential and node B. In addition, the conduction path of transistor 37 is also connected between ground and node B. The control electrode of transistor 33 is connected to the *CIN* input terminal. The control electrode of transistor 35 is connected to the C28*c* terminal and the control electrode of transistor 37 is connected to the *C*28$\bar{c}$ terminal. Referring to FIG. 2, it will be seen that transistors 33 and 35 essentially replace AND gate 20 while transistor 37 essentially replaces OR gate 21 except for the inherent inversion of the gating network. By the expedient of inserting an inverter between node B and the utilization device, or modifying the interconnection as shown in FIG. 2, the same logic operation can be performed.

The conduction path of load transistor 34 is connected from the common junction of the conduction paths of transistors 33 and 35 to input terminal 32 at which a potential −V is supplied. The control electrode of load transistor 34 is also connected to terminal 32. Similarly, load transistor 36 has the conduction path thereof connected between node B and terminal 32. The control electrode of load transistor 36 is also connected to terminal 32. Node B is connected to terminal 39 which is connected to the output logic network which would be analogous to the enabling input terminals of gates 16A in FIG. 2. Alternatively, terminal 39 can be connected to the enabling inputs of gates 15A via an inverter circuit.

Thus, to enable the output gating logic circuitry, a ground level signal is required at output terminal 39 in this embodiment. Of course, this description is illustrative only. As suggested supra, node B is normally clamped to −V via load transistor 36 while node 40 is also normally clamped to the −V voltage level by load transistor 34. In order to have a ground level signal supplied at terminal 39, either transistor 37 must be rendered conductive by a relatively negative signal level at terminal *C*28 or, transistors 33 and 35 must both be concurrently conductive in response to the application of relatively negative signals *CIN* and *C*28*c*. By referring to FIG. 2, analogous operation is observed at gates 20 and 21. Thus, if either the signal $C28\bar{c}$ or both signals *CIN* and *C28c* are relatively negative (i.e. a binary 1) gates 15A are enabled. Conversely, if the signal $\bar{C}28c$ or both signals $\bar{C}28\bar{c}$ and $\overline{CIN}$ are relatively negative, a logic gate network, not shown but similar in configuration to the network shown in FIG. *3a*, will produce a signal which enables gates 16A. This operation is analogous to the operation of gates 22 and 23.

It must be observed, that the circuitry shown in FIGS. 3 and 3*a* inherently produces a signal inversion as suggested supra. Thus, the signals produced by the circuits of FIGS. 3 and 3*a* should be inverted or connected to other output gates in order to identically correspond to the signals produced by the illustrative circuit of FIG. 2. The inversion of signals, change in the gate connections or alternation of circuit configuration uses known techniques of logic circuitry. However, so long as the gating networks described herein and the associated logic functions are performed, the specific implementation of the invention is determined at the discretion of the user thereof.

Moreover, it is understood that a logic circuit such as shown in FIG. 3 or 3*a* is required for each adder network. Furthermore, it is seen that as each adder network is added, the individual gating network is expanded by an additional set of transistors (and load transistors) which are connected to carry output signals of the preceding adder network. Thus, if the information word length is 32 bits and the word is operated upon in four-bit segments, eight adder networks would be required. In this configuration, the output logic circuit gating network for the last adder would require eight switching segments. These segments would be comprised of seven segments similar to those represented by transistors 35 and 37 and the first segment, such as represented by transistors 30 or 33. Moreover, it is apparent that a duplicate set of output logic circuit gating networks would be required with one set for the *CIN* signals and another set for the $\overline{CIN}$ signals. A full set of such gates is not shown and described to preserve brevity. Moreover, the circuit shown in FIG. 4 can be referred to as representative of the full eight stage output logic circuit switching network.

Figure 4:
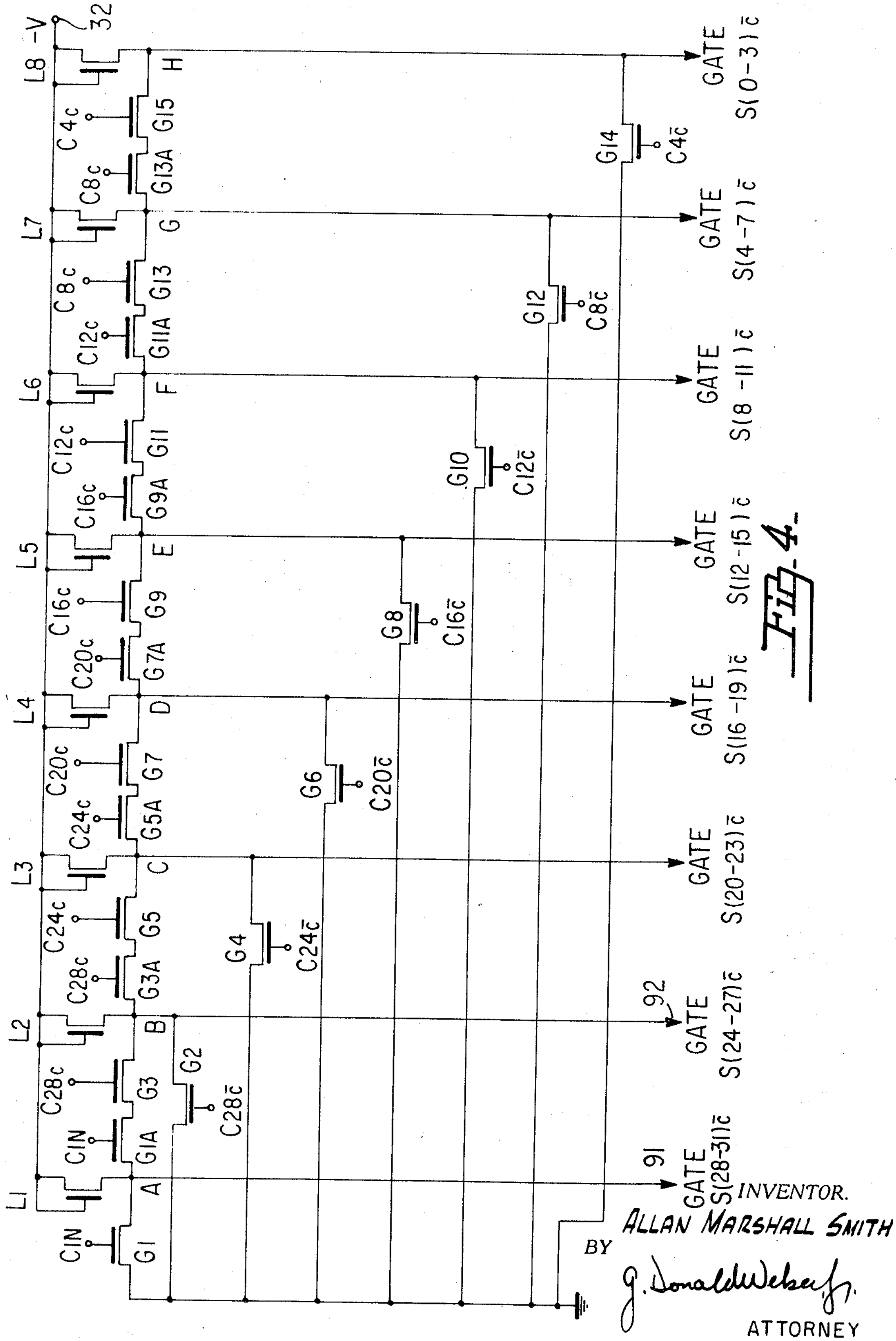
FIG. 4 is a schematic diagram of another embodiment of the propagation or carry ripple network embodying this invention.

Referring now to FIG. 4, there is shown another embodiment of the carry ripple network embodying the instant invention. In the circuit embodiment shown in FIG. 4, the requirement for a separate output logic gating network (and the obvious duplication of circuitry required thereby) for each adder segment in an adder of the type described supra is eliminated. In this embodiment, a single matrix-like circuit arrangement is provided. This matrix-like arrangement is similar to the output logic circuit gating network which would be required for an adder circuit utilizing the circuit configuration described in FIGS. 3 and 3*a*, wherein eight adder segments are included in the adder. In cross-referencing FIGS. 3, 3*a* and 4, nodes A and B in the several embodiments are counterpart circuit points. For example, node A in FIGS. 3 and 4 is connected to the output terminal associated with the S(28–31)$\bar{c}$ gates. Likewise, in FIGS. 3*a* and 4, node B is connected to the output terminal associated with the S(24–27)$\bar{c}$ gates. These gate arrangements correspond to gates 15 or 16 in FIG. 2 (depending upon the signal polarity and the inversion thereof produced by the specific logic circuit utilized). In FIG. 4, however, an additional transmission gate is inserted in each segment. This gate is essentially a duplication of one of the gates in the preceding segment. For example, in the second segment of the circuit (i.e. the segment connected between nodes A and B) gate G1A corresponds to gate G1 in the first segment inasmuch as the control electrode thereof is connected to the *CIN* input. Likewise, gate G3A in the third segment of the carry ripple network (i.e. between nodes B and C) corresponds to gate G3 (of the second segment) inasmuch as the control electrodes thereof are each connected to receive the *C*28*c* signal. The same pattern is repeated in the other segments in the circuit of FIG. 4. Again, it should be understood that while only eight segments are shown in this figure, either more or less segments may be utilized as a function of the length of the information word and the number of adder segments which are being controlled.

Still referring to FIG. 4, the conduction paths of a plurality of transmission gates are connected in series between ground and node H. The first segment includes gate G1 which has the control electrode thereof connected to the CIN input terminal. This segment essentially controls the output gates corresponding to the S(28–31)$\bar{c}$ signals and is identical to the gating circuit shown in FIG. 3. The second segment includes gates G1A and G3 connected in series between nodes A and B. In addition, gate G2 has the conduction path thereof connected between ground and node B. Gate G1 has the control electrode thereof connected to the CIN terminal, gate G3 has the input (control electrode) connected to the *C*28*c* terminal and gate G2 has the input connected to receive the $C28\bar{c}$ signal. Nodes A and B are each connected to source −V at terminal 32 via the conduction paths of load transistors L1 and L2, respectively. Node B is also connected so that the second segment essentially controls the output gates corresponding to the S(24–27)*c* signals. Thus, the second segment of the gating network shown in FIG. 4 is analogous to the circuit shown in FIG. 3*a*. Of course, the second segment of the circuit in FIG. 4 includes transistor G1A which is not included in the circuit of FIG. 3*a*.

Gates L1–L8 are load precharging devices. Each of these gates is connected to a separate node A–H to precharge the node to the –V potential. In addition, each of the nodes B–H is selectively connected to ground via the conduction path of an even-numbered gate G2–G14, respectively, when the appropriate gate is conductive. The control electrodes of even-numbered gates G2–G14 are connected to receive carry output signals from the last stage of each adder associated with the $\overline{C}IN$ input in each adder rank. In the embodiment described, the adder ranks include four stages wherein the signals supplied to the even numbered gates are *C28$\bar{c}$; C24$\bar{c}$; C20$\bar{c}$; C16$\bar{c}$; C12$\bar{c}$; C8$\bar{c}$;* and *C4$\bar{c}$.* Conversely, the signals supplied to the odd numbered gates (G3–G15) are *C28c*, *C24c*, *C20c*, *C16c*, *C12c*, *C8c*, and *C4c*.

As noted supra, each segment includes a gate which is a duplicate of a gate in the preceding segment. The incorporation of the duplicate gate in the succeeding segment prevents a sneak current path which might otherwise occur wherein the signal at one of the nodes A–H could be erroneously produced. By precluding the sneak current path, the single matrix-like gate network FIG. 4 can replace the larger number of gates suggested relative to FIGS. 3 and 3*a*. That is, if the gates having the A suffix (i.e. the duplicate gates) are omitted, an error situation can occur. For example, node A should achieve the ground level, if and only if, input signal *CIN* is high (i.e., relatively negative with respect to ground potential). However, if *CIN* is low (i.e., approximately equal to ground potential), but *C28c* and *C28$\bar{c}$* are both low, then gate G2 conducts to drive node B to ground. Node B now operates as a source for gate G3 which conducts to drive node A to ground. Obviously, this is an erroneous condition.

In another example, node B should be low if either *CIN* and *C28c* are high or *C28$\bar{c}$* is high. If, however, C24$\bar{c}$ and C24*c* are both high, node B will attain the low level due to conduction by G4 and G5. Thus, a sneak path exists in this network as well and an erroneous condition is indicated at node B.

Consequently, in the circuit shown in FIG. 4, the inclusion of the duplicate gate in each segment obviates this sneak path problem. For example, if signal *CIN* is low, gate G1 is off and there is no conduction between ground and node A through gate G1. Moreover, gate G1A is also off producing an open circuit in the network between nodes A and B. Thus, node A cannot be erroneously switched to ground level via a sneak path through gate G3.

In the second example, gate G3A will provide a similar open circuit in the segment between nodes B and C. Consequently, an erroneous signal indication at node B is prevented. Similar operation exists in each of the other segments and a sneak current path is prevented.

Additional examples of the operation of the circuit shown in FIG. 4 are deemed unnecessary. However, it is seen that by application of appropriate signals from the adder circuits (see FIGS. 1 and 2), output signals will be supplied at nodes A through H. These output signals will determine which output logic circuit gates at logic level I are enabled. When the selected gates of logic level I are enabled by signals from the circuit shown in FIG. 4 (or the counterpart circuit for the $\overline{C}IN$ and associated signals), the output sum signals will be transmitted to the output gates at logic level II. The signals produced at logic level II are supplied to a suitable utilization device more rapidly due to the parallel operation of several adders.

Figure 5:
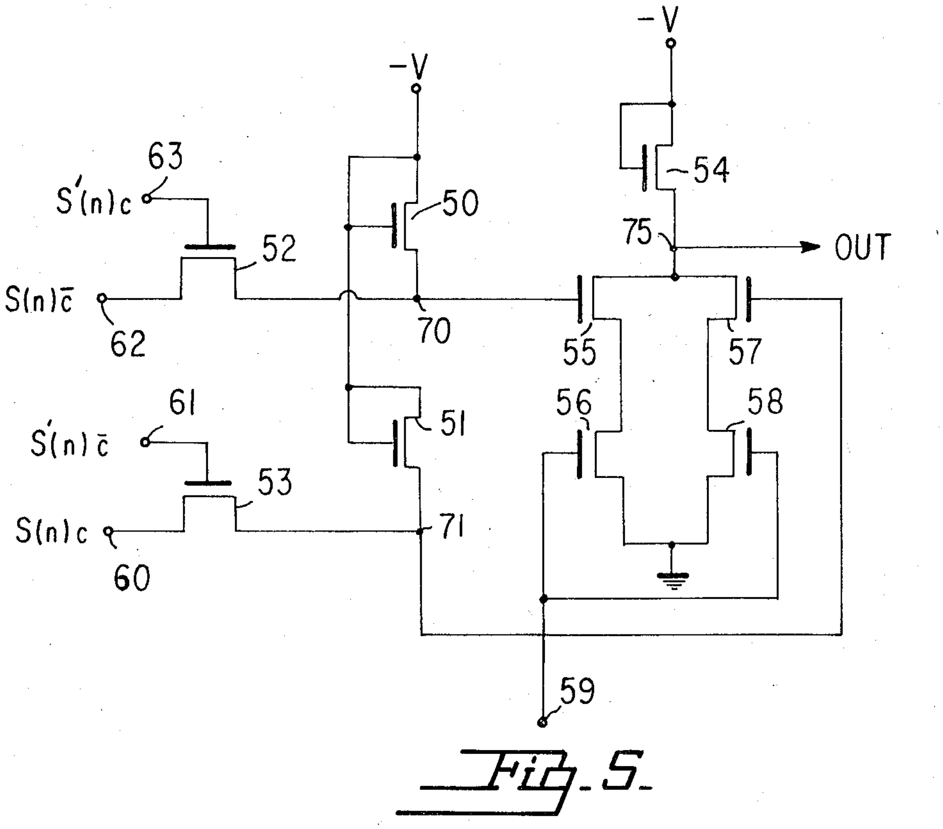
FIG. 5 is a schematic diagram of a final output gating configuration.

Referring now to FIG. 5, there is shown a suitable output circuit which is connected to the adder circuit and selectively provides the appropriate output signals. In addition, this circuit includes suitable drive capabilities which may be necessary in some applications. Of course, other output circuit configurations may be utilized.

This circuit performs a function similar to that performed by Gates 15, 16, and 17 in FIG. 2. It selects the appropriate conditional sum, S(*n*)*c* or S(*n*)$\bar{c}$, in response to control signals from a pair of carry ripple networks. The first C/R network (as in FIG. 4) functions similarly to gates 20, 21, 20A, 21A et sequence except for the inherent inversion of the outputs. The second C/R network functions as gates 22, 23, 22A, 23A et sequence, also excepting the inherent inversion. The network of FIG. 5 is, in essence, an AND/OR select gate including a strobe feature. One such network is required for each output bit of a complete conditional sum adder. It should be noted that this particular network uses mixed logic, whereby the analogy to gates 15, 16, and 17 is not perfect.

In this circuit, terminals 60 and 62 receive conditional sum signals S(*n*)*c* and S(*n*)$\bar{c}$, from adders B(*n*)*c* and B(*n*)$\bar{c}$ respectively. Input terminal 60 is connected to the conduction path of gate 53 while input terminal 62 is connected to the conduction path of transmission gate 52. The opposite ends of the conduction paths of transmission gates 52 and 53 are connected to nodes 70 and 71, respectively. The control electrode of transmission gate 52 is connected to control terminal 63 while the control electrode of transmission gate 53 is connected to control terminal 61. Control terminals 61 and 63 receive the signals S′(*n*)$\bar{c}$ and S′(*n*)*c*, respectively. These signals are supplied from corresponding nodes of the two carry ripple networks described above. Of course, each output network is connected to one output terminal (node) of the first carry ripple network and the counterpart terminal (node) of the associated complementary carry ripple network (i.e. relative to the opposite carry signals).

Load transistors 50 and 51 have the conduction paths thereof connected from the –V source to nodes 70 and 71, respectively. The control electrodes of transistors 50 and 51 are also connected to the –V source. Thus, transistors 50 and 51 operate as precharging networks to effectively charge nodes 70 and 71 to the –V voltage level.

Nodes 70 and 71 are connected to the control electrodes of transistors 55 and 57, respectively. Load device 54 has the conduction path thereof connected between node 75 and the –V source. The control electrode of load transistor 54 is also connected to –V source. Thus, load transistor 54 operates as a precharging device to charge node 75 to the –V level.

The conduction path of transistor 56 is connected in series with the conduction path of transistor 55, between node 75 and ground. Likewise, the conduction path of transistor 58 is connected in series with the conduction path of transistor 57 between ground and node 75. The control electrodes of transistors 56 and 58 are connected together and to terminal 59 wherein a strobe or clock signal is applied. The strobe signal may be a periodically recurring signal if desired.

In operation, nodes 70, 71 and 75 are precharged to the −V voltage level. In the absence of a clock signal at terminal 59, the output signal will be a −V voltage signal. That is, even though gates 55 and 57 are rendered conductive by the precharge signal at the control electrode thereof, gates 56 and 58 are nonconductive in the absence of a clock signal.

Depending upon the signal combination supplied to gates 52 and 53, one of the signals at node 70 or 71 may be switched to the relatively high voltage level. This relatively high voltage level may be on the order of ground potential, for example. Nevertheless, this relatively high potential will render one of transistors 55 and 57 nonconductive. Consequently, with the application of the relatively negative clock signal at terminal 59, transistors 56 and 58 are rendered conductive. Thus, node 75 is selectively clamped to ground through the circuit path which includes the two conductive semiconductors, namely semiconductors 55 and 56 or semiconductors 57 and 58. The signal at node 75 is connected to the output device. As noted supra, this circuit provides additional drive capabilities to the output circuit. Moreover, this circuit permits a type of phantom ORing of the adder output signals with other signals on the output node 75.

There is described a conditional adder circuit which utilizes a carry ripple propagation network. This carry ripple propagation network utilizes MOS techniques and technology. Thus, the advantages of this technology are incorporated into the circuit. This type of propagation network produces a relatively fast operating circuit for propagating carry ripple signals. Moreover, the embodiments disclosed supra include certain illustrative properties. It is to be understood that any modifications in the illustrative properties or configurations, but which fall within the purview of this invention, are intended to be included therein. For example, the signal levels disclosed may be altered and the polarity of the signals supplied may be reversed. However, these changes are apparent to those skilled in the art and are meant to be included within the above description.

What is claimed is:

1. A network comprising:

a plurality of load devices, each having a conduction path with first and second terminals at the ends thereof, said first terminal of each of said load devices being adapted for connection to a source of potential;

a plurality of control semiconductor devices, each having a conduction path with first and second electrodes at the ends thereof and a control electrode for controlling the conduction of the path, said first electrode of each of said control semiconductor devices being adapted for connection to a source of potential;

means coupling the second terminal of each of said load devices to the second electrode of a separate one of said control semiconductor devices and defining nodes;

a plurality of transmission gate means, each having a conduction path and first and second control electrodes for controlling the conduction of the path;

means coupling said nodes in series, said means comprising the conduction path of a separate one of said transmission gate means connected between each successive pair of nodes in said series, the first one of said nodes in said series being coupled to one end of the conduction path of a first one of said transmission gate means;

means coupling said first control electrode of said first one of said transmission gate means to said control electrode of that one of said control semiconductor devices which has its second electrode coupled to said first one of said nodes; and means coupling said first control electrode of each succeeding transmission gate means in said series to said second control electrode of the transmission gate means which immediately preceeds it in said series.

2. The network recited in claim 1 wherein each said load device comprises a separate MOS transistor, each having a conduction path with first and second electrodes at the ends thereof and a gate electrode for controlling the conduction of the path and wherein said first and second electrodes of said MOS transistors correspond to said first and second terminals of said load devices respectively; and means for applying a control voltage to the gate electrode of each said MOS transistor.

3. The network recited in claim 1 wherein each of said transmission gate means comprises first and second MOS transistors, each having a conduction path and a gate electrode for controlling the conduction of the conduction path, and means coupling the conduction paths of associated said first and second MOS transistors in series, wherein said series connected conduction paths of said first and second MOS transistors correspond to said conduction path of said transmission gate means and wherein the gate electrodes of said first and second MOS transistors correspond to said first and second control electrodes of said transmission gate means, respectively.

4. The network recited in claim 1 including arithmetic circuit means having a plurality of addend, augend and carry-in input terminals, and a plurality of sum and carry-out output terminals;

means coupling each control electrode of selected ones of said control semiconductor devices to a separate one of said carry-out output terminals; and means coupling each said second control electrode of each of said transmission gate means to a separate one of said carry-out output terminals other than those to which the control electrodes of said control semiconductor devices are coupled.

5. The network recited in claim 4 further comprising means coupling one of said carry-in input terminals to said control electrode of that one of said control semiconductor devices which has its second electrode coupled to said first one of said nodes.

6. The network recited in claim 5 further including output gate means having a plurality of input terminals, output terminal means and a plurality of control terminals, wherein said output terminal means provides output signals representative of input signals present on selected ones of said input terminals under control of signals applied to said control terminals;

means coupling each of said sum outputs of said arithmetic circuit means to a separate one of said input terminals of said output gate means; and means coupling each of said nodes to a separate group of said control terminals of said output gate means.

* * * * *